(12) United States Patent
Kobayashi et al.

(10) Patent No.: US 12,436,971 B2
(45) Date of Patent: Oct. 7, 2025

(54) SUPPORT DEVICE AND METHOD

(71) Applicant: Hitachi, Ltd., Tokyo (JP)

(72) Inventors: Miho Kobayashi, Tokyo (JP); Soichi Watanabe, Tokyo (JP); Mitsuo Hayasaka, Tokyo (JP); Shimpei Nomura, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 0 days.

(21) Appl. No.: 18/597,755

(22) Filed: Mar. 6, 2024

(65) Prior Publication Data
US 2025/0053575 A1 Feb. 13, 2025

(30) Foreign Application Priority Data

Aug. 8, 2023 (JP) ................. 2023-129248

(51) Int. Cl.
*G06F 16/00* (2019.01)
*G06F 16/27* (2019.01)

(52) U.S. Cl.
CPC .................... *G06F 16/27* (2019.01)

(58) Field of Classification Search
CPC ..... H04L 2463/102; H04L 63/08; H04L 9/40; H04L 12/1859; H04L 41/04; H04L 51/212; H04L 51/214; H04L 51/216; H04L 63/0272; H04L 63/0428; H04L 65/103; H04L 65/104; H04L 65/1096; H04L 65/1101; H04L 65/612; H04L 65/765; H04L 65/80; H04L 67/34; H04L 69/329; G06F 16/90335; G06F 16/904; G06F 2111/10; G06F 30/20; G06Q 20/203; G06Q 10/06; G06Q 50/12; G06Q 30/00; G06Q 10/087; G06Q 30/0261
See application file for complete search history.

(56) References Cited

U.S. PATENT DOCUMENTS

| | | | |
|---|---|---|---|
| 7,152,078 B2 | 12/2006 | Yamagami | |
| 2006/0064466 A1 | 3/2006 | Shiga et al. | |
| 2010/0205044 A1* | 8/2010 | Scheer | G06Q 10/08 |
| | | | 705/28 |
| 2017/0168903 A1* | 6/2017 | Dornemann | G06F 11/2038 |
| 2021/0157498 A1 | 5/2021 | Kobayashi et al. | |
| 2023/0058573 A1* | 2/2023 | Singh | G06F 3/0488 |

FOREIGN PATENT DOCUMENTS

JP 2006-092054 A 4/2006

* cited by examiner

*Primary Examiner* — Shyue Jiunn Hwa
(74) *Attorney, Agent, or Firm* — Procopio, Cory, Hargreaves & Savitch LLP

(57) ABSTRACT

A support device and method capable of supporting construction of an optimal secondary usage environment for data are proposed.
A plurality of construction candidate plans for a secondary usage environment including a copy method for copying the data between a designated copy source site and a designated copy destination site of the data are calculated. A time and a cost required for copying the data and an operation cost of the secondary usage environment to be constructed are calculated for each of the calculated construction candidate plans, and the plurality of construction candidate plans based on a calculation result together with evaluations thereof are presented.

14 Claims, 12 Drawing Sheets

FIG. 3
REGION AND ZONE MANAGEMENT TABLE 20

| # | REGION | ZONE | STORAGE DEVICE |
|---|---|---|---|
| 0 | Tokyo-JP | Zone1 | 12345 |
| 1 | Paris-FR | Zone4 | 23567 |
| 2 | Osaka-JP | Zone4 | 34567 |
| 3 | Frankfurt-DE | Zone1 | 45678 |
| ... | ... | ... | ... |

20A  20B  20C  20D

FIG. 4
STORAGE DEVICE-VOLUME MANAGEMENT TABLE 21

| # | STORAGE DEVICE | VOL |
|---|---|---|
| 0 | 12345 | 1 |
| 1 | 12345 | 10 |
| 2 | 12345 | 100 |
| 3 | 23567 | 3 |
| ... | ... | ... |

SERVICE AND CONFIGURATION INFORMATION MANAGEMENT TABLE 22

| ID | VOL | STORAGE DEVICE | REMOTE COPY | VIRTUAL REMOTE COPY | SNAPSHOT | MIGRATION | BACKUP TO OBJECT CLOUD STORAGE |
|---|---|---|---|---|---|---|---|
| 0 | 1 | 12345 | Remote Copy PVOL of ID 1 | n/a | n/a | n/a | n/a |
| 1 | 5 | 23456 | Remote Copy SVOL of ID 0 | n/a | n/a | n/a | n/a |
| 2 | 11 | 45678 | n/a | Virtual VOL of ID 3 | n/a | n/a | n/a |
| 3 | 111 | 45679 | n/a | Original VOL of ID 2 | n/a | n/a | n/a |
| 4 | 123 | 11111 | n/a | n/a | n/a | n/a | n/a |
| 5 | 124 | 11111 | n/a | n/a | Snapshot of ID 4 | n/a | n/a |
| 6 | 222 | 56789 | n/a | n/a | n/a | n/a | Backup to Tokyo-JP |
| 7 | 333 | 40000 | n/a | n/a | n/a | Migration of ID 4 | n/a |
| ... | ... | ... | ... | ... | ... | ... | ... |

22A  22B  22C  22D  22E  22F  22G  22H

FIG. 6
DB SERVER AND STORAGE AND VOL MANAGEMENT TABLE 23

| DB SERVER | STORAGE DEVICE | VOL | DATA TYPE | SERVICE |
|---|---|---|---|---|
| db-1 | 12345 | 1 | DB A | Remote Copy PVOL |
| | | 10 | DB A | Remote Copy PVOL |
| | | 100 | DB B | - |
| db-2 | 23567 | 3 | DB A | - |
| ... | ... | ... | ... | ... |
| 23A | 23B | 23C | 23D | 23E |

FIG. 7

NETWORK MANAGEMENT TABLE 24

| NETWORK NAME | SITE 1 | | SITE 2 | | TYPE | BAND-WIDTH |
| --- | --- | --- | --- | --- | --- | --- |
| | REGION | ZONE | REGION | ZONE | | |
| NW-A | Tokyo-JP | Zone1 | OSAKA-JP | Zone1 | Shared | 10GbPS |
| NW-B | Paris-FR | Zone4 | Frankfurt-DE | Zone1 | Dedicate | 5Gbps |
| ... | ... | ... | ... | ... | ... | ... |

CONSTRUCTION PLAN LIST 60

| PLAN | COPY METHOD | STORAGE PERFORMANCE | CON-STRUCTION COST | CON-STRUCTION TIME | OPERATION COST | PRIORITY |
|---|---|---|---|---|---|---|
| A | REMOTE COPY + SNAPSHOT | LOW | 50USD | 120 MINUTES | 60USD /MONTH | 1 |
| B | VIRTUAL REMOTE COPY | MEDIUM | 30USD | 30 MINUTES | 40USD /MONTH | 2 |
| ... | ... | ... | ... | ... | ... | ... |
| 60A | 60B | 60C | 60D | 60E | 60F | 60G |

SUPPORT DEVICE AND METHOD

BACKGROUND OF THE INVENTION

1. Field of the Invention

The present invention relates to a support device and method, and is suitably applied to, for example, a secondary usage environment construction support device that supports construction of a secondary usage environment for user data.

2. Description of Related Art

In the related art, there are many cases where a backup is acquired and managed for data protection with respect to data accumulated in a storage device on an on-premise or a cloud. Therefore, there is a desire to not only simply store such backup data, but also to create a new value in the backup data by using the backup data for a development test or a stress test (secondary usage of the backup data).

In the secondary usage of the backup data, the backup data is separately copied and the copied data is used, and there are various methods as a method for replicating data (hereinafter, also referred to as a copy method as appropriate).

For example, PTL 1 discloses a copy method (hereinafter, referred to as a migration method) that transfers a full copy of data from a copy source to a copy destination. When a secondary usage environment for data is constructed by using the migration method disclosed in PTL 1, although it takes time to construct the secondary usage environment, there is an advantage that a delay does not occur in response when the secondary usage environment is first used.

PTL 2 discloses a copy method (hereinafter, referred to as a remote copy method) in which journal (change history) data is stored in a volume at a main site and then transferred to a copy destination in an order of change, thereby making it possible to update data at a remote site non-synchronously with an update process at the main site. By combining the remote copy method with a snapshot disclosed in PTL 2, although a performance may be inferior to that of the migration method disclosed in PTL 1, there is an advantage that a secondary usage environment can be constructed in a short time.

PTL 3 discloses a copy method (hereinafter, referred to as a virtual remote copy method) in which only necessary data is copied from a copy source to a copy destination on demand. In a case of the virtual remote copy method as well, although a performance may be inferior to that of the migration method disclosed in PTL 1, there is an advantage that a secondary usage environment can be constructed in a short time.

CITATION LIST

Patent Literature

PTL 1: JP2006-92054A
PTL 2: U.S. Pat. No. 7,152,078 specification
PTL 3: U.S. Patent Application Publication No. 2021/0157498 specification

SUMMARY OF THE INVENTION

As described above, each copy method has merits and demerits, but usually, an administrator who manages a database is not familiar with a storage function in many cases. Therefore, when the secondary usage environment is constructed (user data is replicated), there is a problem in that it is not possible to select an optimal copy method, such as which copy method is to be used to replicate user data.

The invention is made in view of the above points, and is to propose a support device and method capable of supporting construction of an optimal secondary usage environment for data.

In order to solve such a problem, according to the invention, there is provided a support device connected to a plurality of sites each having a server and a storage device, and for supporting construction of a secondary usage environment in which the server uses data stored in the storage device. The support device includes: a construction candidate plan calculation unit configured to calculate a plurality of construction candidate plans for the secondary usage environment including a copy method for copying the data between a designated copy source site and a designated copy destination site of the data; and a construction candidate plan presentation unit configured to calculate, for each of the construction candidate plans calculated by the construction candidate plan calculation unit, a time and a cost required for copying the data and an operation cost of the secondary usage environment to be constructed, and to present the plurality of construction candidate plans based on a calculation result together with evaluations thereof.

According to the invention, there is provided a support method executed by a support device configured to be connected to a plurality of sites each having a server and a storage device, and to support construction of a secondary usage environment in which the server uses data stored in the storage device. The support method includes: a first step of calculating a plurality of construction candidate plans for the secondary usage environment including a copy method for copying the data between a designated copy source site and a designated copy destination site of the data; and a second step of calculating, for each of the calculated construction candidate plans, a time and a cost required for copying the data and an operation cost of the secondary usage environment to be constructed, and to present the plurality of construction candidate plans based on a calculation result together with evaluations thereof.

According to the support device and method in the invention, it is possible to present a construction candidate plan for an optimal secondary usage environment in consideration of the time and cost required for copying data and the operation cost of the secondary usage environment to be constructed.

According to the invention, it is possible to implement a support device and method capable of supporting construction of an optimal secondary usage environment for data.

BRIEF DESCRIPTION OF THE DRAWINGS

FIG. 3 is a chart showing a configuration example of a region and zone management table.

FIG. 4 is a chart showing a configuration example of a storage device-volume management table.

FIG. 5 is a chart showing a configuration example of a service and configuration information table.

FIG. 6 is a chart showing a configuration example of a database server and storage and volume management table.

FIG. 7 is a chart showing a configuration example of a network management table.

FIG. 13 is a chart showing a configuration example of a construction plan list.

DESCRIPTION OF EMBODIMENTS

Figure 1:
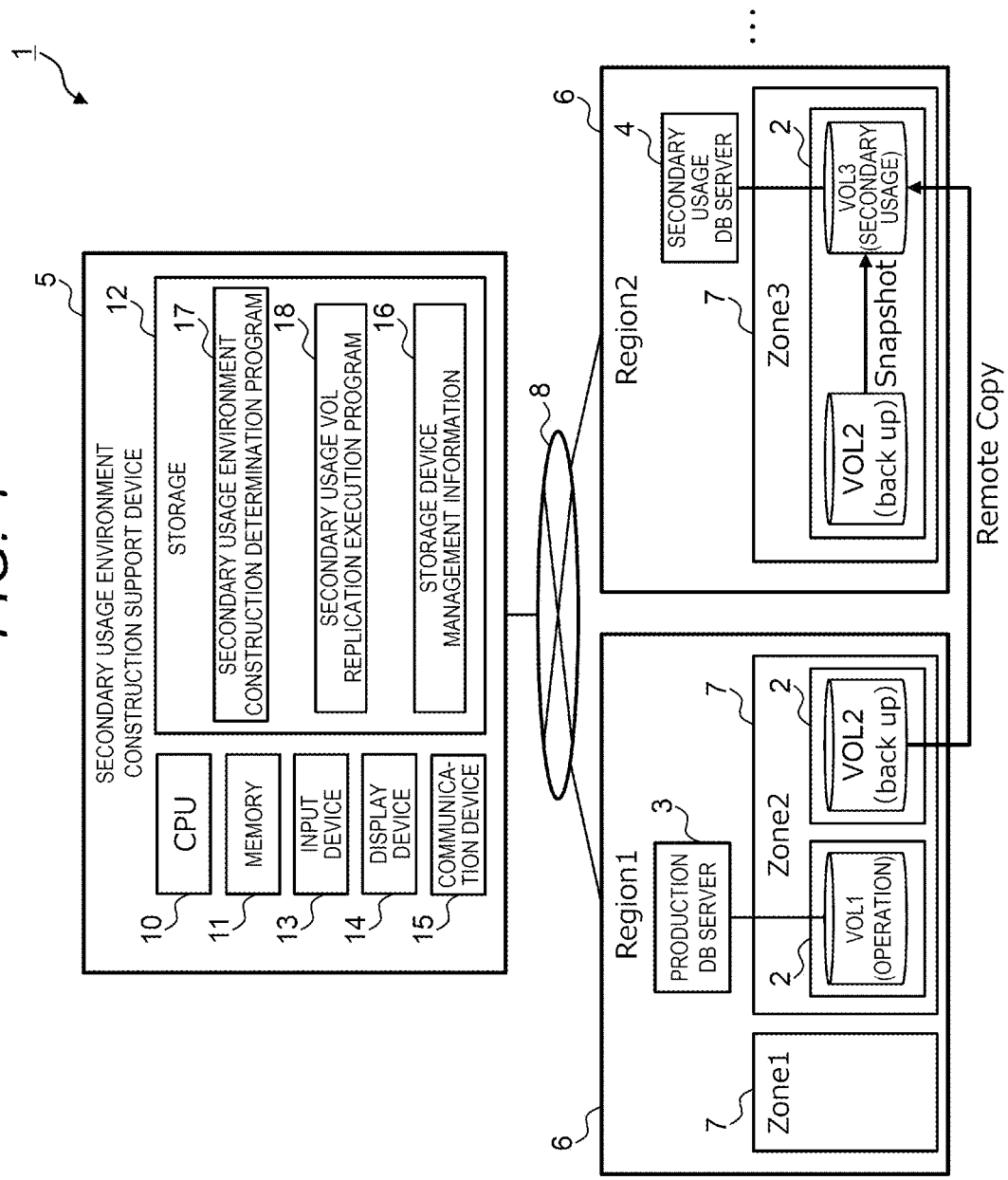
FIG. 1 is a block diagram showing a configuration of a secondary usage environment construction support system according to a present embodiment.

Hereinafter, an embodiment of the invention will be described in detail with reference to the drawings. Hereinafter, the term "copy" is used in the same meaning as "replication" of data.

1. Configuration of Secondary Usage Environment Construction Support System According to Present Embodiment In FIG. 1, 1 denotes a secondary usage environment construction support system according to the present embodiment as a whole. The secondary usage environment construction support system includes a plurality of storage devices 2, a production database server 3, a secondary usage database server 4, and a secondary usage environment construction support device 5.

Each storage device 2 is implemented by a block storage device in which a large number of large-capacity nonvolatile storages as such a redundant array of inexpensive disks (RAID) devices are mounted. The storage device 2 is disposed in a site (for example, a data center) in each zone 7 set in each region 6 in the world.

The same zone 7, different zones 7 in the same region, and different regions 6 are appropriately connected via a network (not shown). Accordingly, data is transmitted and received between the storage devices 2 in the same zone 7 connected via the network, between the storage devices 2 disposed in different zones 7 in the same region 6, and between the storage devices 2 disposed in any of the zones 7 in the different regions 6, so that data can be replicated.

The production database server 3 is a server device that centrally manages user data and provides various types of service such as search, an update, storage, and a backup of the user data. In the production database server 3, one or a plurality of storage devices 2 are attached, and user data is read from and written to a specific volume (hereinafter, referred to as an operation volume) VOL1 created in the attached storage device 2.

For some of the operation volumes VOL1, one or a plurality of back up volumes VOL2 are set as a volume pair in the same storage device 2, in another storage device 2 in the same zone 7, or in the storage device 2 in a different region 6, and user data written in the operation volume VOL is replicated and backed up in the back up volume VOL2 synchronously or non-synchronously.

The secondary usage database server 4 is a server device that uses a backup function of the production database server 3 or the secondary usage database server 4 to perform a development test, a stress test, or the like, using user data copied from the operation volume VOL1 or the back up volume VOL2 to a specific volume (hereinafter, referred to as a secondary usage data storage volume) VOL3 in the storage device 2 attached to the own server.

The secondary usage environment construction support device 5 is a computer device having a function of proposing a method for replicating user data from the operation volume VOL1 or the back up volume VOL2 to the secondary usage data storage volume VOL3 or controlling actual replication, and is connected to the storage device 2, the production database server 3, and the secondary usage database server 4 in each region 6 via a network 8.

The secondary usage environment construction support device 5 includes information processing resources such as a central processing unit (CPU) 10, a memory 11, a storage 12, an input device 13, a display device 14, and a communication device 15.

The CPU 10 is a processor that controls an overall operation of the secondary usage environment construction support device 5. The memory 11 is implemented by a volatile semiconductor memory such as a static random access memory (SRAM) or a dynamic random access memory (DRAM), and is used as a working memory of the CPU 10.

The storage 12 is implemented by a large-capacity nonvolatile storage such as a hard disk device or a solid state drive (SSD), and stores and holds various types of programs and data that require long-term storage. Storage device management information 16, a secondary usage environment construction determination program 17, and a secondary usage volume replication execution program 18, which will be described later, are also stored and held in the storage 12.

The input device 13 is implemented by a mouse, a keyboard, and the like, and is used by an operator to input various types of information and instructions to the secondary usage environment construction support device 5. The display device 14 includes, for example, a liquid crystal display or an organic electro-luminescence (EL) display, and is used to display various types of screens and information.

The communication device 15 is implemented by, for example, a network interface card (NIC), and is used by the secondary usage environment construction support device 5 to communicate with each storage device 2, the production database server 3, and the secondary usage database server 4 via the network 8.

2. Secondary Usage Environment Construction Support Function

Next, a secondary usage environment construction support function mounted on the secondary usage environment construction support device 5 will be described. The secondary usage environment construction support function is a function of calculating several methods for constructing a secondary usage environment for user data (method for replicating the user data) as secondary usage environment construction candidate plans, based on a request (hereinafter, referred to as a detailed request) from a user related to an operation form of the secondary usage environment and various types of management information related to each storage device 2 in the system, and presenting the calculated secondary usage environment construction candidate plans to the user together with evaluations thereof.

When any of the secondary usage environment construction candidate plans is selected by the user from the presented secondary usage environment construction candidate plans, the secondary usage environment construction support device 5 controls the storage device 2 as a copy source and/or the production database server 3 as a copy destination to copy user data stored in the operation volume VOL1 and/or the back up volume VOL2 to the secondary usage data storage volume VOL3 by a method for replicating the secondary usage environment construction candidate plan, and constructs the secondary usage environment for the user data.

As a method for implementing such a secondary usage environment construction support function, as shown in FIG. 1, the storage device management information 16, the secondary usage environment construction determination program 17, and the secondary usage volume replication execution program 18 are stored in the storage 12 of the secondary usage environment construction support device 5.

Figure 2:
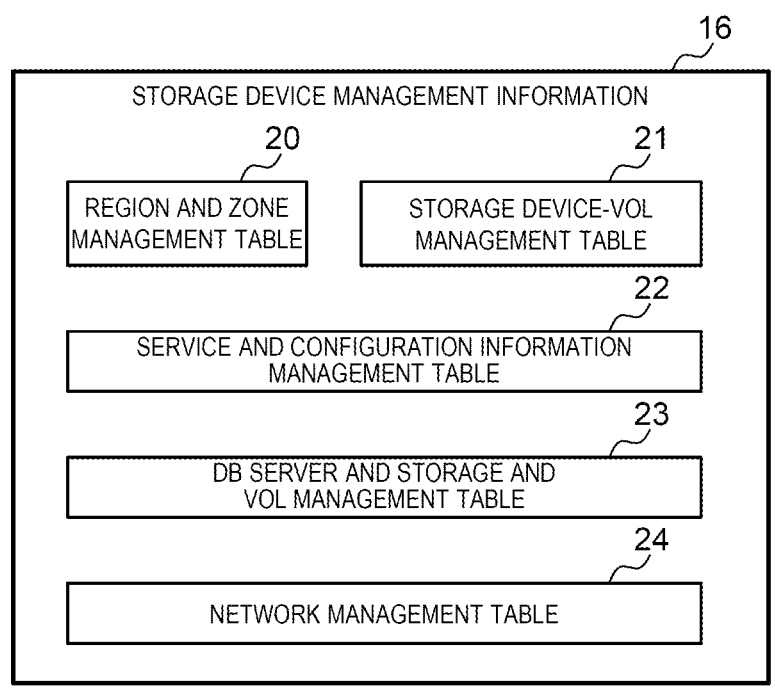
FIG. 2 is a block diagram showing a specific configuration example of storage device management information.

As shown in FIG. 2, the storage device management information 16 includes at least a region and zone management table 20, a storage device-volume management table 21, a service and configuration information management table 22, a database server and storage and volume management table 23, and a network management table 24.

The region and zone management table 20 is a table for managing a location of each storage device 2 in the system, and includes a management number column 20A, a region column 20B, a zone column 20C, and a storage device column 20D as shown in FIG. 3. In the region and zone management table 20, one record (row) corresponds to one storage device 2 present in the system.

The management number column 20A stores a management number unique to a corresponding record in the region and zone management table 20, which is assigned to the record. In a case of the present embodiment, a serial number starting from "0" is applied as such a management number.

The region column 20B stores the region 6 where the corresponding storage device 2 is disposed, and the zone column 20C stores the zone 7 where a site where the storage device 2 is disposed is present. The storage device column 20D stores an identification number (storage device number) unique to the storage device 2 in the system assigned to the storage device 2.

Accordingly, in a case of an example in FIG. 3, for example, it is shown that a record to which a management number "0" is assigned is a record related to the storage device 2 to which a storage device number "12345" is assigned, and the storage device 2 is disposed at a site in the zone 7 referred to as "Zone 1" in the region 6 referred to as "Tokyo-JP".

The storage device-volume management table 21 is a table for managing a location of each volume created in the system, and includes a management number column 21A, a storage device column 21B, and a volume column 21C as shown in FIG. 4. In the storage device-volume management table 21, one record (row) corresponds to one volume created in the system.

The management number column 21A stores a management number unique to a corresponding record in the storage device-volume management table 21, which is assigned to the record. In a case of the present embodiment, a serial number starting from "0" is applied as such a management number.

The volume column stores an identification number (volume number) unique to a volume assigned to the corresponding volume. The storage device column 21B stores a storage device number of the storage device 2 in which the volume is created.

Accordingly, in a case of an example in FIG. 4, for example, it is shown that a record to which a management number "0" is assigned is a record related to a volume to which a volume number "1" is assigned, and the volume is provided in the storage device 2 to which a storage device number "12345" is assigned.

The service and configuration information management table 22 is a table used to manage what kind of service (backup service) each volume present in the system is used for and in what configuration. As shown in FIG. 5, the service and configuration information management table 22 includes an ID column 22A, a volume column 22B, a storage device column 22C, a remote copy column 22D, a virtual remote copy column 22E, a snapshot column 22F, a migration column 22G, and a backup to object cloud storage column 22H. In the service and configuration information management table 22, one record (row) corresponds to one volume created in the system.

The ID column 22A stores an identification number (hereinafter, referred to as a record number) unique to a corresponding record in the service and configuration information management table 22, which is assigned to the record. In the present embodiment, a serial number starting from "0" is used as such a record number.

The volume column 22B stores a volume number of a corresponding volume. The storage device column 22C stores a storage device number of the storage device 2 in which the volume is created.

The remote copy column 22D stores information on whether the volume is used for remote copy, and configuration information on the remote copy when the volume is used for remote copy. For example, when the volume is not used for remote copy, "n/a" is stored. When the volume is used for remote copy, information as to whether the volume is a copy source ("PVOL") or a copy destination ("SVOL") of the remote copy, and a record number of a record corresponding to a volume of the other party of the remote copy are stored.

Accordingly, in a case of an example in FIG. 5, for example, it is shown that a record with the record number "0" is a record corresponding to a volume with a volume number "1" created in the storage device 2 to which a storage device number "12345" is assigned. FIG. 5 shows that the volume is set in a copy pair (a pair for performing data copy) of remote copy and a volume with a volume number "5" corresponding to the record with the record number "1" created in the same storage device 2, and is set as the copy source of the remote copy ("Remote Copy PVOL of ID 1").

The virtual remote copy column 22E stores information on whether the volume is used for virtual remote copy, and configuration information on the virtual remote copy when the volume is used for virtual remote copy. For example, when the volume is not used for virtual remote copy, "n/a" is stored. When the volume is used for virtual remote copy, information as to whether the volume is a copy source volume ("Original VOL") that is actually present or a copy destination virtual volume ("Virtual VOL"), and a record number of a record corresponding to a volume of the other party of the virtual remote copy are stored.

Accordingly, in the case of the example in FIG. 5, for example, it is shown that a record with a record number "2"

is a record corresponding to a volume with a volume number "11" created in the storage device 2 with a storage device number "45678". FIG. 5 shows that the volume is set in a copy pair of a virtual remote copy and a volume with a volume number "111" created in the storage device 2 with a storage device number "45679", and is set as a virtual volume of the virtual remote copy ("Virtual VOL of ID 3").

The snapshot column 22F stores information as to whether data of a snapshot of any volume is stored in the volume, and a record number of a record corresponding to an original volume when data of a snapshot is stored.

Accordingly, in the case of the example in FIG. 5, for example, it is shown that a record with a record number "5" is a record corresponding to a volume with a volume number "124" created in the storage device 2 with a storage device number "11111". FIG. 5 shows that data of a snapshot of a volume with a volume number "123" created in the same storage device 2 is stored in the volume.

In the remote copy and the virtual remote copy, data is copied to a copy destination volume in synchronization with (at the same timing as) storage in the operation volume in the copy source, and the snapshot is created in non-synchronization with (at different timings from) the storage of the data in the operation volume.

The migration column 22G stores information as to whether data migrated from any of volumes is stored in the volume, and when the migrated data is stored, a record number of a record corresponding to a migration source volume.

Accordingly, in the case of the example in FIG. 5, for example, it is shown that a record with a record number "7" is a record corresponding to a volume with a volume number "333" created in the storage device with a storage device number "40000". FIG. 5 shows that the volume stores data migrated from the volume with the volume number "123" created in the storage device 2 with a storage device number "11111".

Further, the backup to object cloud storage column 22H stores information as to whether data of the volume is backed up to an object storage device on a cloud, and when the data is backed up, a backup destination region.

Accordingly, in the case of the example in FIG. 5, for example, it is shown that in a record with a record number "6", data stored in a volume with a volume number "222" created in the storage device 2 with a storage device number "56789" is backed up to an object storage device on the cloud in the region "Tokyo-JP".

The database server and storage and volume management table 23 is a table for managing the storage device 2 being attached to the production database server 3 and the operation volume VOL1 used by the production database server 3 in the storage device 2.

As shown in FIG. 6, the database server and storage and volume management table 23 includes a database server column 23A, a storage device column 23B, a volume column 23C, a data type column 23D, and a service column 23E. In the database server and storage and volume management table 23, one record in the database server column 23A corresponds to one production database server 3 present in the system.

The database server column 23A stores an identifier (database server identifier) assigned to the corresponding production database server 3. The storage device column 23B stores a storage device number of the storage device 2 that is attached to the production database server 3.

The volume column 23C, the data type column 23D, and the service column 23E are created in the corresponding storage device 2, and are classified to correspond to the operation volume VOL1 connected to the corresponding production database server 3.

The volume column 23C stores a volume number of the corresponding operation volume VOL1. The data type column 23D stores a data type of user data stored in the operation volume VOL1. The service column 23E stores, when the operation volume VOL1 is used in some copy service supported by the storage device 2, a name of the copy service and a role of the operation volume VOL1 in the copy service.

Accordingly, in a case of an example in FIG. 6, for example, it is shown that the storage device 2 with the storage device number "12345" is attached to the production database server 3 with a database server identifier "db-1". FIG. 6 shows that volumes having the volume numbers "1", "10", and "100" in the storage device 2 are used as the operation volume VOL1 for the production database server 3.

Further, FIG. 6 shows that user data of a database "DAA" is stored in each of the operation volume VOL1 with the volume number "1" and the operation volume VOL1 with the volume number "10", and these operation volumes VOL1 are set as the copy source volume "(Remote Copy PVOL)" of the remote copy for the user data.

The network management table 24 is a table used for managing a network for connecting sites provided in each zone 7 (FIG. 1) of each region 6 (FIG. 1), and includes a network name column 24A, a first site column 24B, a second site column 24C, a type column 24D, and a bandwidth column 24E as shown in FIG. 7. In the network management table 24, one record (row) corresponds to one network that connects two sites.

The network name column 24A stores a name (network name) of a corresponding network. The type column 24D stores a type of the network. The network types include "Shared" and "Dedicate". "Shared" is a network type in which a line is shared with other users, which can reduce costs, but a speed may be slightly unstable. The "Dedicate" type is a network type including a dedicated line, and has an advantage that the speed is relatively stable although the cost is high. The bandwidth column 24E stores a bandwidth of the network.

The first site column 24B and the second site column 24C are classified into region columns 24BA and 24CA and zone columns 24BB and 24CB. The region column 24BA of the first site column 24B stores an identifier of the region 6 in which one site (hereinafter, referred to as a first site) of the two sites connected to a corresponding network is present. The zone column 24BB of the first site column 24B stores an identifier of the zone 7 in which the first site is present. The region column 24CA of the second site column 24C stores an identifier of the region 6 in which the other site (hereinafter, referred to as a second site) of the two sites is present. The zone column 24CB of the second site column 24CB stores an identifier of the zone 7 in which the second site is present.

Accordingly, in a case of an example in FIG. 7, it is shown that the first site in the zone 7 referred to as "Zone1" in the region 6 referred to as "Tokyo-JP" and the second site in the zone 7 referred to as "Zone1" in the region 6 referred to as "Osaka-JP" are connected by a network referred to as "NW-A", a type of the network is "Shared", and a bandwidth is "10 Gbps".

Meanwhile, the secondary usage environment construction determination program 17 (FIG. 1) is a program having a function of determining whether to construct a secondary usage environment for secondary usage of user data stored in the operation volume VOL1 or the back up volume VOL2 in the system.

The secondary usage environment construction determination program 17 calculates, based on the storage device management information 16 stored in the storage 12, a predicted time required for completing copying of the user data and a subsequent operation cost, combines these calculated values and a detailed request of the user, and presents a construction plan for a secondary usage environment (hereinafter, referred to as the secondary usage environment construction candidate plan) to the user in a ranking format.

The secondary usage volume replication execution program 18 (FIG. 1) is a program having a function of constructing a secondary usage environment for the secondary usage environment construction candidate plan, by controlling the necessary storage device 2 in accordance with the secondary usage environment construction candidate plan selected by the user from the secondary usage environment construction candidate plans presented by the secondary usage environment construction determination program 17.

Specific processing contents of the secondary usage environment construction determination program 17 and the secondary usage volume replication execution program 18 will be described later.

3. Configuration of Various Screens

Figure 8:
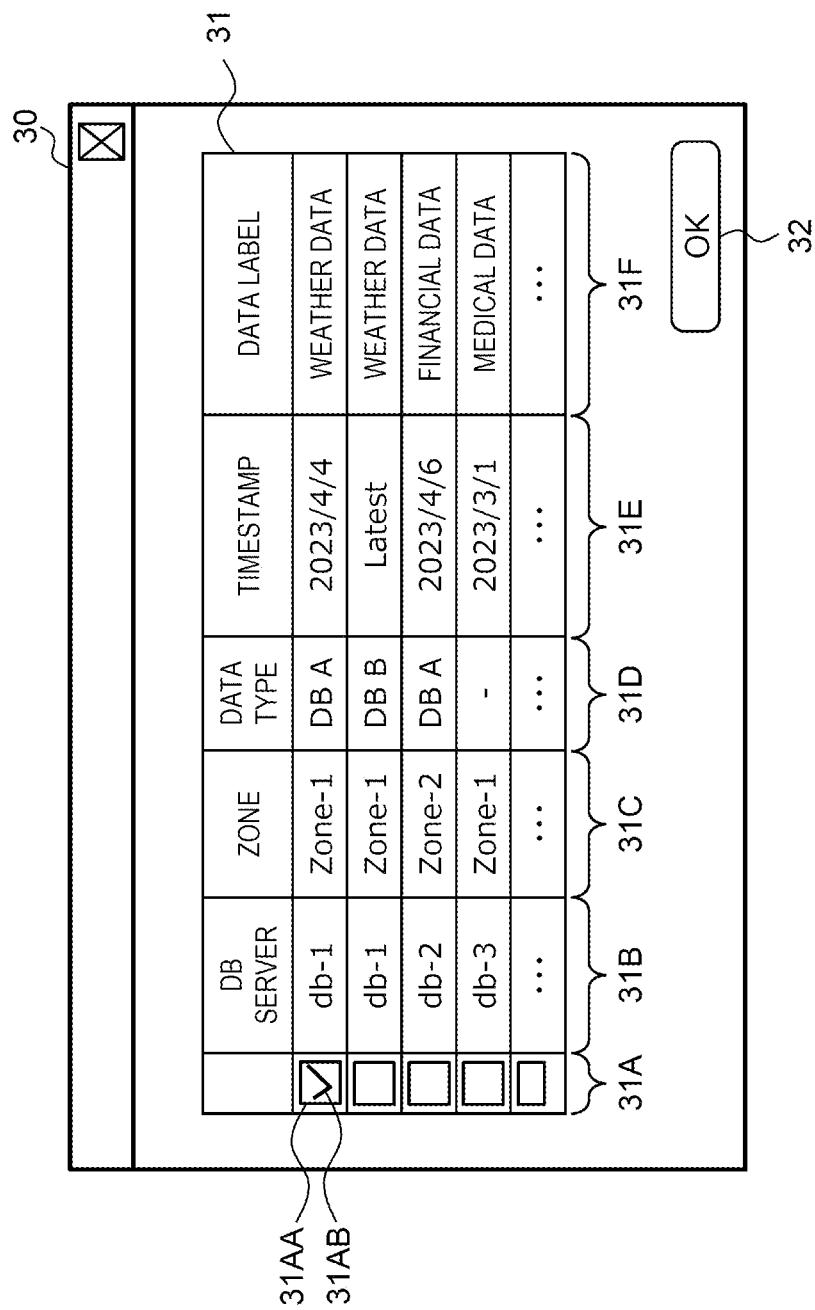
FIG. 8 is a diagram showing a screen configuration example of a database catalog screen.

FIG. 8 shows a database catalog screen 30 that can be displayed on the display device 14 (FIG. 1) of the secondary usage environment construction support device 5 by a predetermined operation. The database catalog screen 30 is a screen for the user to designate a copy source when the user data stored in any one of the operation volume VOL1 or the back up volume VOL2 is copied to the secondary usage data storage volume VOL3 for secondary usage.

A database server catalog is displayed on the database catalog screen 30. The database server catalog is a list of combinations of the production database server 3 present in the system and a type of user data handled by the production database server 3, and includes records (rows) for each combination.

Each record is classified into a checkbox column 31A, a database server column 31B, a zone column 31C, a data type column 31D, a timestamp column 31E, and a data label column 31F. A checkbox 31AA is displayed in the checkbox column 31A.

The database server column 31B displays a database server identifier of the corresponding production database server 3. The zone column 31C displays a zone identifier of the zone 7 in which the production database server 3 is disposed. The data type column 31D displays a type of a database used by the production database server 3 (a type of an application for storing data in the database).

The timestamp column 31E displays a date on which a backup of the database is last acquired. "Latest" in the drawing means the latest data, and means that data stored in a corresponding database is not backed up. The data label column 31F displays a label assigned to the corresponding database by the user.

On the database catalog screen 30, by clicking the checkbox 31AA provided in the checkbox column 31A of a record corresponding to a desired combination among combinations of the production database server 3 and the database listed in a database catalog 31, user data in the database used by the production database server 3 constituting the combination can be selected from the corresponding operation volume VOL1 or back up volume as data as a secondary usage target. At this time, a check mark 31AB is displayed in the checked checkbox 31AA.

Figure 9:
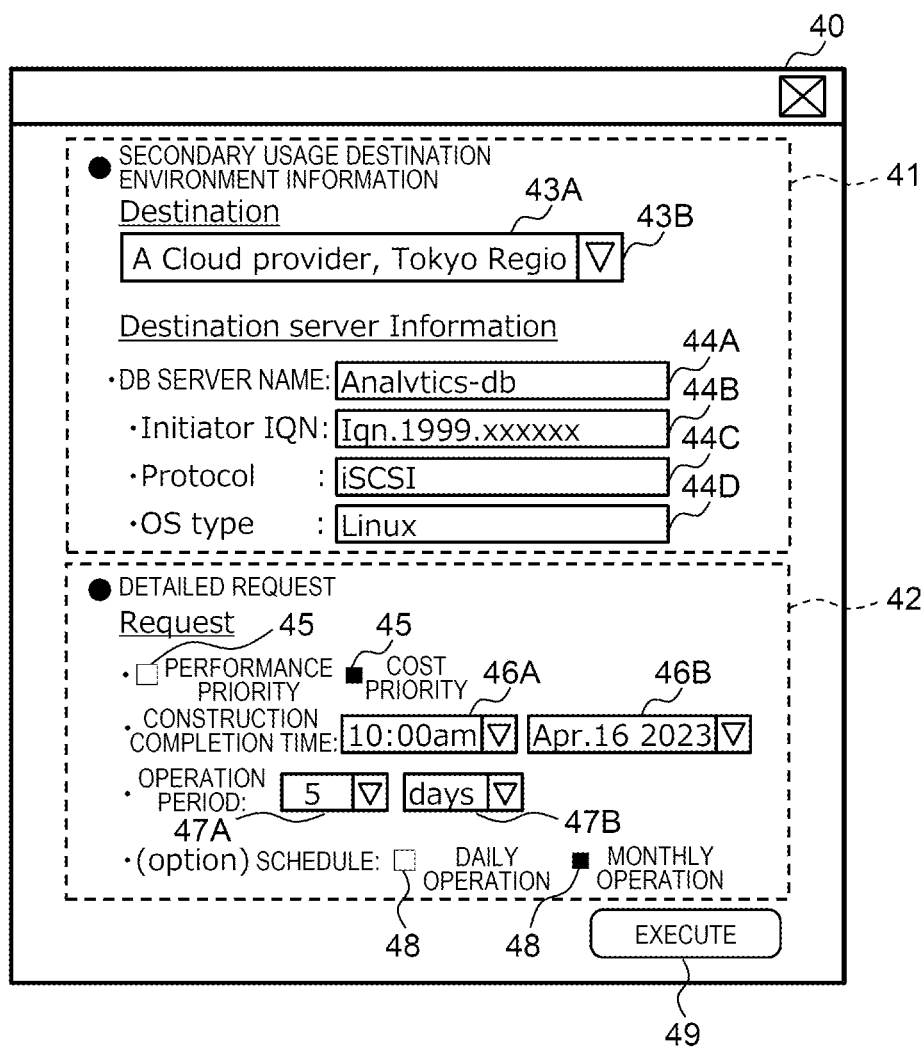
FIG. 9 is a diagram showing a screen configuration example of a setting screen.

After the user selects a desired copy source as described above, when an OK button 32 displayed at a lower right of the database catalog screen 30 is clicked, a setting screen 40 as shown in FIG. 9 is displayed instead of the database catalog screen 30. The setting screen 40 includes a secondary usage environment information setting region 41 and a detailed request setting region 42.

The secondary usage environment information setting region 41 is a region for setting a copy destination of user data for secondary usage, and includes a copy destination designation box 43A and a pull-down button 43B for designating the region 6 as the copy destination of the user data.

In the secondary usage environment information setting region 41, by clicking the pull-down button 43B, a pull-down menu (not shown) is displayed that lists several regions 6 that can be designated as the copy destinations, and by selecting a desired region 6 from the regions 6 displayed in the pull-down menu, the region 6 can be designated as a copy destination of user data. The region 6 as a copy destination designated at this time is displayed in the copy destination designation box 43A.

First to fourth text boxes 44A to 44D are provided below the copy destination designation box 43A. In the secondary usage environment information setting region 41, the secondary usage database server 4 (FIG. 1) can be designated by inputting a server name of the secondary usage database server 4 into the first text box 44A, inputting an initiator iSCSI qualified name (IQN) of the secondary usage database server 4 into the second text box 44B, inputting a protocol stored in the secondary usage database server 4 into the third text box 44C, and inputting an operating system (OS) type of the secondary usage database server 4 into the fourth text box 44D.

The detailed request setting region 42 is a region for the user to set a detailed request related to an operation form of a secondary usage environment for the user data. In the present embodiment, a priority item, a construction completion time, an operation period, and a schedule can be set as the detailed request.

The "priority item" indicates which of a performance and a cost is to be prioritized in the secondary usage environment. The detailed request setting region 42 is provided with toggle switches 45 corresponding to "performance priority" that prioritizes a performance of the secondary usage environment and "cost priority" that prioritizes a construction cost of the secondary usage environment and a subsequent operation cost. By clicking and selecting the toggle switch 45 corresponding to a desired option ("performance priority" or "cost priority") of the toggle switches 45, it is possible to set a secondary usage environment to be constructed corresponding to the option. When the toggle switch 45 is clicked, a display state transitions to a state indicating that the corresponding option is selected (blacked out).

The "construction completion time" indicates a construction completion time desired by the user for the secondary usage environment. In the detailed request setting region 42, a time and date at which the construction of the secondary usage environment is to be completed can be selected by a pull-down method, and the selected time is displayed in a time display field 46A, and the selected date is displayed in a date display field 46B.

The "operation period" indicates a period in which the secondary usage environment is used (hereinafter, referred to as an operation period). In the detailed request setting region 42, the operation period can be selected by a pull-down method, and the operation period selected at this time is displayed in operation period fields 47A and 47B.

"Schedule" indicates a schedule for using the secondary usage environment. The detailed request setting region 42 is provided with toggle switches 48 corresponding to "daily operation" in which the secondary usage environment is used every day and "monthly operation" in which the secondary usage environment is used once or several times a month. By clicking and selecting the toggle switch 48 corresponding to a desired option ("daily operation" or "monthly operation") of the toggle switches 48, it is possible to set a secondary usage environment to be constructed corresponding to the option. When the toggle switch 48 is clicked, a display state transitions to a state indicating that the corresponding option is selected.

On the setting screen 40, by clicking an execution button 49 after setting a secondary usage destination of the user data or the detailed request as described above, it is possible to instruct the secondary usage environment construction support device 5 to execute a process (hereinafter, referred to as a secondary usage environment construction candidate plan calculation process) of calculating a candidate plan for the secondary usage environment for the user data (hereinafter, referred to as a secondary usage environment construction candidate plan).

Figure 10:
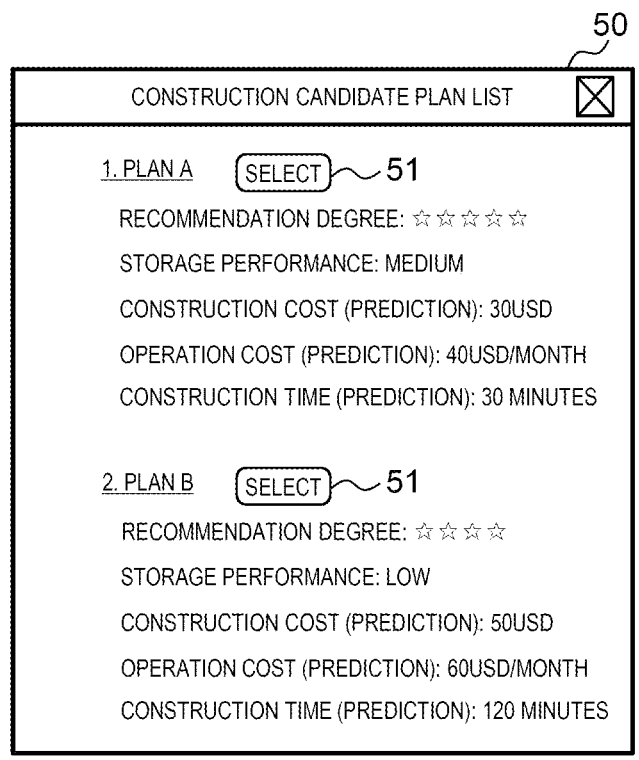
FIG. 10 is a diagram showing a screen configuration example of a construction candidate plan list screen.

Meanwhile, FIG. 10 shows a construction candidate plan list screen 50 displayed on the display device 14 (FIG. 1) by the secondary usage environment construction determination program 17 (FIG. 1) after the secondary usage environment construction candidate plan calculation process is ended. On the construction candidate plan list screen 50, information related to all the secondary usage environment construction candidate plans calculated by the secondary usage environment construction candidate plan calculation process is listed in a ranking format.

Actually, on the construction candidate plan list screen 50, for each secondary usage environment construction candidate plan calculated by the secondary usage environment construction candidate plan calculation process, evaluations of a storage performance when the secondary usage environment construction candidate plan is adopted ("storage performance"), a predicted construction cost ("construction cost (prediction)"), a predicted operation cost ("operation cost (prediction)"), a predicted construction time ("construction time (prediction)"), a degree to which the secondary usage environment construction candidate plan is recommended ("recommendation degree"), and the like are displayed.

In this case, for the "storage performance", evaluation results obtained by evaluating an I/O performance of the secondary usage environment construction candidate in three levels are displayed with characters "high", "medium", or "low". Specific numerical values are displayed for the "construction cost", the "operation cost", and the "construction time". Further, with respect to the "recommendation degree", an evaluation result obtained by evaluating a degree of recommendation of the secondary usage environment construction candidate plan in five levels is displayed as the number of stars.

Further, on the construction candidate plan list screen 50, selection buttons 51 are displayed in association with the listed secondary usage environment construction candidate plans. Thus, the user clicks the selection button 51 corresponding to the secondary usage environment construction candidate plan to be adopted at that time among the secondary usage environment construction candidate plans listed on the construction candidate plan list screen 50, thereby selecting the secondary usage environment construction candidate plan as a construction plan for the secondary usage environment for the user data.

Figure 11:
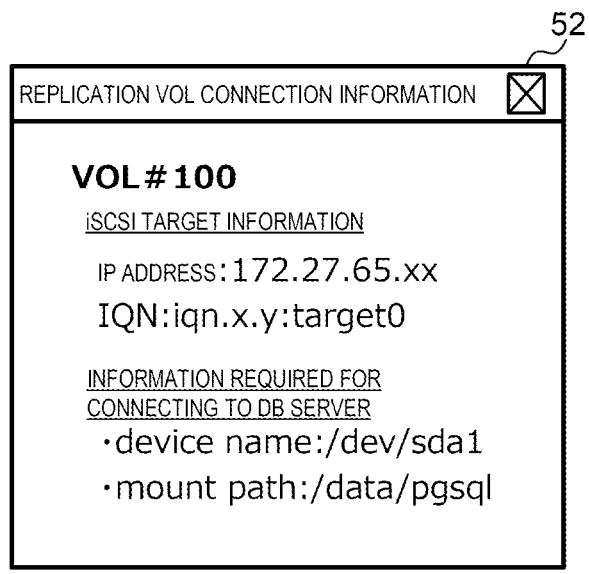
FIG. 11 is a diagram showing a screen configuration example of a replication volume connection information screen.

When one secondary usage environment construction candidate plan is selected from the plurality of secondary usage environment construction candidate plans listed on the construction candidate plan list screen 50 as described above, a secondary usage environment corresponding to the selected secondary usage environment construction candidate plan is constructed in the copy destination designated by the user under control of the secondary usage environment construction support device 5. Thereafter, a replication volume connection information screen 52 shown in FIG. 11 is displayed on the display device 14 of the secondary usage environment construction support device 5 instead of the construction candidate plan list screen 50.

The replication volume connection information screen 52 is a screen on which information related to the secondary usage data storage volume VOL3 (FIG. 1) to which the user data as the secondary usage target is copied as described above and information required for connecting the secondary usage data storage volume VOL3 to the secondary usage database server 4 are listed.

Actually, the replication volume connection information screen 52 displays a volume number ("VOL #100" in FIG. 11) of the secondary usage data storage volume VOL3 connected to the secondary usage database server 4, isCSI target information, and information required for connecting the secondary usage data storage volume VOL3 to the secondary usage database server 4 ("information required for connecting to DB server").

Specifically, on the replication volume connection information screen 52, an IP address for accessing a volume and ION are displayed as "iSCSI target information". On the replication volume connection information screen 52, a device name of a volume and a path (mount path) for mounting the volume are displayed as "information required for connecting to secondary usage database server".

4. Various Processes Related to Secondary Usage Environment Construction Support Function Next, a flow of a series of processes (hereinafter, referred to as a secondary usage environment construction support process) executed in the secondary usage environment construction support device 5 in relation to the secondary usage environment construction support function will be described.

In the following description, a processing subject of the various processes is described as the secondary usage environment construction determination program 17 (FIG. 1) or the secondary usage volume replication execution program 18 (FIG. 1). However, in practice, the CPU 10 (FIG. 1) of the secondary usage environment construction support device 5 executes a process based on the secondary usage environment construction determination program 17 or the secondary usage volume replication execution program 18.

4-1 Secondary Usage Environment Construction Support Process

Figure 12:
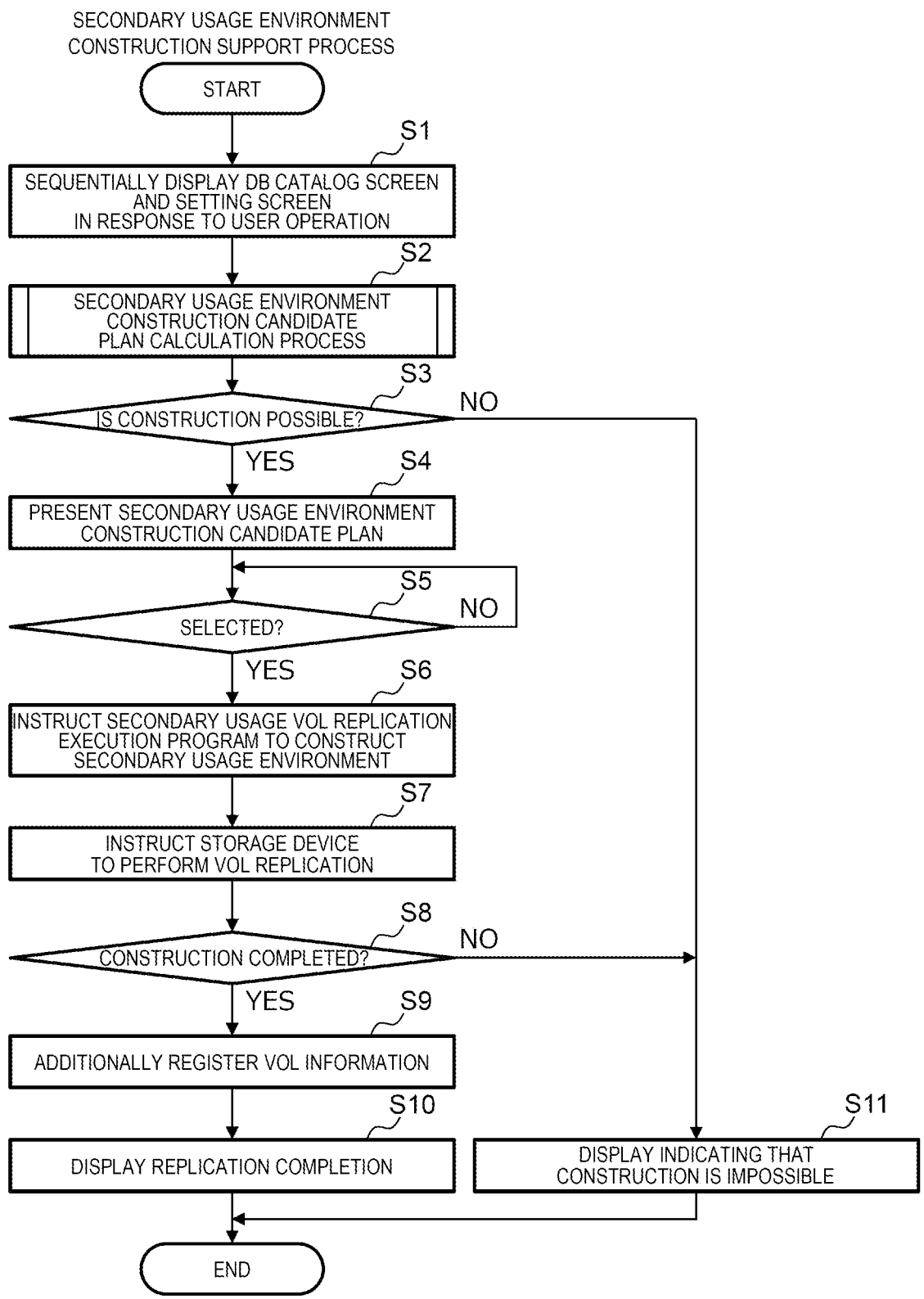
FIG. 12 is a flowchart of a processing procedure of a secondary usage environment construction support process.

FIG. 12 shows a specific flow of the secondary usage environment construction support process described above. The secondary usage environment construction support process is started when an instruction to display the database catalog screen 30 described above with reference to FIG. 8 is input by a predetermined operation of the user.

First, the secondary usage environment construction determination program 17 sequentially displays the database catalog screen 30 and the setting screen 40 that is described above with reference to FIG. 9 on the display device 14 (FIG. 1) in response to a user operation (S1).

The secondary usage environment construction determination program 17 creates a construction plan list 60 as shown in FIG. 13 by executing a secondary usage environment construction candidate plan calculation process of calculating a secondary usage environment construction candidate plan in accordance with contents of copy source selection and various settings performed using the displayed database catalog screen 30 and setting screen 40 (S2).

The construction plan list 60 is a list used for managing each secondary usage environment construction candidate plan calculated by the secondary usage environment construction candidate plan calculation process, and includes a plan identifier column 60A, a copy method column 60B, a storage performance column 60C, a construction cost column 60D, a construction time column 60E, an operation cost column 60F, and a priority column 60G as shown in FIG. 13. In the construction plan list 60, one record (row) corresponds to one secondary usage environment construction candidate plan.

The plan identifier column 60A stores an identifier unique to the secondary usage environment construction candidate plan assigned to the corresponding secondary usage environment construction candidate plan. The copy method column 60B stores a copy method (replication method) used in the secondary usage environment construction candidate plan. The storage performance column 60C stores which of three levels as "high", "medium", and "low" a performance of the storage device 2 as a copy destination in the secondary usage environment construction candidate plan is.

The construction cost column 60D stores a construction cost in a case of constructing the secondary usage environment for the user data according to the corresponding secondary usage environment construction candidate plan. A time required for constructing the secondary usage environment is stored in a construction time. The operation cost column 60F stores a cost required for operating the secondary usage environment.

The priority column 60G stores a priority of the corresponding secondary usage environment construction candidate plan calculated in a course of the secondary usage environment construction candidate plan calculation process. Details of the "priority" will be described later.

Accordingly, in a case of an example in FIG. 13, for example, it is shown that a copy method in a secondary usage environment construction candidate plan to which a plan identifier "B" is assigned is "virtual remote copy", a performance of the storage device 2 in a secondary usage environment to be constructed is "medium", a construction cost is "30 USD", a construction time is "30 minutes", and an operation cost is "40 USD/month". FIG. 13 also shows that the priority of the secondary usage environment construction candidate plan is "1".

Subsequently, the secondary usage environment construction determination program 17 determines whether it is possible to construct the secondary usage environment for the user data as the secondary usage target, based on a processing result of the secondary usage environment construction candidate plan calculation process of step S2 (S3).

When a negative result is obtained in the determination, the secondary usage environment construction determination program 17 displays, on the display device 14, a message indicating that the secondary usage environment desired by the user cannot be constructed (S11), and then ends the secondary usage environment construction support process.

In contrast, when a positive result is obtained in the determination of step S3, the secondary usage environment construction determination program 17 displays, on the display device 14 (FIG. 1), the construction candidate plan list screen 50 (FIG. 10), which lists information on each secondary usage environment construction candidate plan registered in the construction plan list 60 in a ranking format (S4).

The secondary usage environment construction determination program 17 then waits for the user to select any one secondary usage environment construction candidate plan from secondary usage environment construction candidate plans listed on the construction candidate plan list screen 50 (S5).

When one secondary usage environment construction candidate plan is eventually selected from the secondary usage environment construction candidate plans, the secondary usage environment construction determination program 17 calls the secondary usage volume replication execution program 18 (FIG. 1), and instructs the called secondary usage volume replication execution program 18 to construct a secondary usage environment corresponding to the secondary usage environment construction candidate plan selected by the user (S6). Hereinafter, this instruction is referred to as a secondary usage environment construction instruction.

When the secondary usage environment construction instruction is given, the secondary usage volume replication execution program 18 creates the secondary usage data storage volume VOL3 (FIG. 3) with a required capacity in any storage device 2 attached to the secondary usage database server 4 (FIG. 1) designated by the user on the setting screen 40 (FIG. 9), and gives an instruction to the storage device 2 as the copy destination (or copy source and copy destination) so as to copy the user data as the secondary usage target to the created secondary usage data storage volume VOL3 as necessary (S7).

Thus, the storage device 2 that receives the instruction constructs, for example, when the copy method in the secondary usage environment construction candidate plan selected by the user in step S5 is a remote copy method, a migration method, or a backup method, the secondary usage environment so that a full copy of the user data (data movement) is performed from the operation volume VOL1 (FIG. 1) as the copy source to the secondary usage data storage volume VOL3 as the copy destination. Thereafter, as the operation volume VOL1 is updated, updated data is synchronously or non-synchronously copied to the secondary usage data storage volume VOL3.

When the copy method in the secondary usage environment construction candidate plan selected by the user in step S5 is a virtual remote copy method, the secondary usage environment is constructed so that an access path from the operation volume VOL1 to the secondary usage data storage volume VOL3 is set. Thereafter, necessary user data is copied from the operation volume VOL1 to the secondary usage data storage volume VOL3 as the copy destination via the access path.

Further, when the copy method in the secondary usage environment construction candidate plan selected by the user in step S5 is a snapshot method, the secondary usage environment is constructed in the same manner as in a case where the copy method is the remote copy method or the like, or in the same manner as in a case where the copy method is the virtual remote copy method.

Subsequently, the secondary usage volume replication execution program 18 determines whether the construction of the secondary usage environment according to the secondary usage environment construction candidate plan selected by the user is successful (S8). When a negative result is obtained in the determination, the secondary usage volume replication execution program 18 displays, on the display device 14, a message indicating that the secondary usage environment desired by the user cannot be constructed (S11), and then ends the secondary usage environment construction support process.

In contrast, when a positive result is obtained in the determination of step S8, the secondary usage volume replication execution program 18 additionally registers information related to the secondary usage data storage volume VOL3 (FIG. 1) created in step S7 in the storage device-volume management table 21 (FIG. 4) and the database server and storage and volume management table 23 (FIG. 6) (S9).

The secondary usage volume replication execution program 18 displays, on the display device 14, the replication volume connection information screen 52 described above with reference to FIG. 11 in which the information related to the secondary usage data storage volume VOL3 created in step S7 is listed (S10), and thereafter ends the secondary usage environment construction support process.

Figure 14:
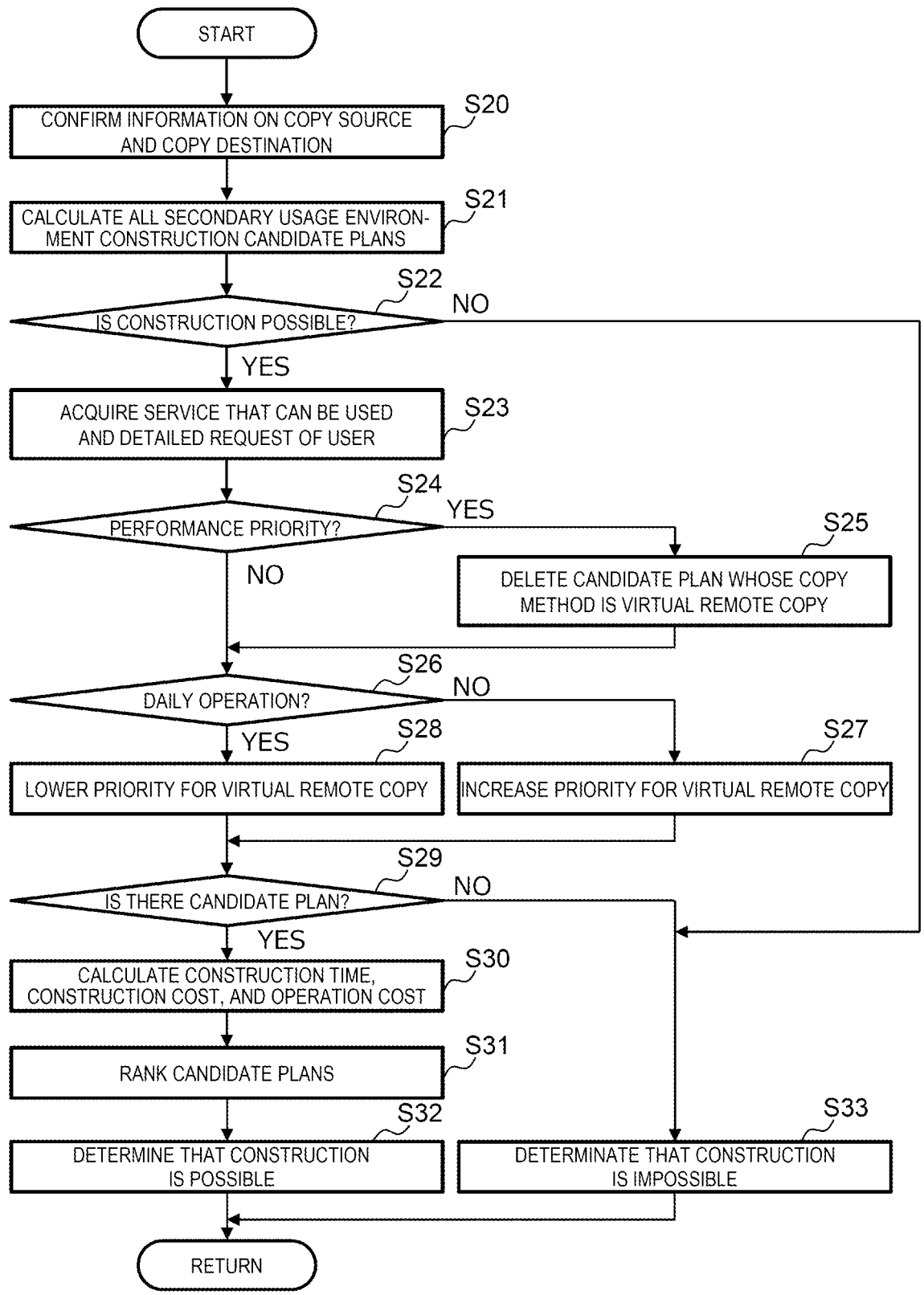
FIG. 14 is a flowchart showing a processing procedure of a secondary usage environment construction candidate plan calculation process.

4-2 Secondary Usage Environment Construction Candidate Plan Calculation Process FIG. 14 shows a flow of a secondary usage environment construction candidate plan calculation process executed by the secondary usage environment construction determination program 17 in step S2 of the secondary usage environment construction support process described above with reference to FIG. 12. The secondary usage environment construction determination program 17 calculates all secondary usage environment construction candidate plans according to a processing procedure shown in FIG. 14.

Actually, when the secondary usage environment construction determination program 17 proceeds to step S2 of the secondary usage environment construction support process, the secondary usage environment construction determination program 17 starts the secondary usage environment construction candidate plan calculation process shown in FIG. 14. First, the secondary usage environment construction determination program 17 confirms a copy source and a copy destination based on the storage device management information 16 (FIG. 2) and various types of information related to the storage devices 2 as the copy source and the copy destination input by the user using the database catalog screen 30 and the setting screen 40 (S20).

Specifically, for the copy source, the secondary usage environment construction determination program 17 first acquires a database server stored in the database server column 31B in a record of the database catalog 31 (FIG. 8) designated by the user on the database catalog screen 30 (FIG. 8) as the target production database server 3. The secondary usage environment construction determination program 17 acquires a database server and a data type in the data type column 31D of the record as a database that is a copy target.

For example, in a case of an example in FIG. 8, since the check mark 31AB is displayed in the checkbox 31AA of the uppermost record, the secondary usage environment construction determination program 17 acquires "db-1" as the target production database server 3 and "DB A" as the data type.

The secondary usage environment construction determination program 17 refers to the database server and storage and volume management table 23 (FIG. 6) based on the production database server 3 and the data type acquired as described above, and acquires volume numbers of all operation volumes VOL1 (FIG. 1) storing data (user data) of the database and a storage device number of the storage device 2 in which the operation volume VOL1 is created.

For example, in the case of the examples in FIGS. 8 and 6, it is understood that the data of the database with the data type "DB A" for the production database server 3 "db-1" is stored in the volumes (operation volume VOL1) with the volume numbers "1" and "10" created in the storage device 2 with the storage device number "12345". Therefore, the secondary usage environment construction determination program 17 acquires these pieces of information as the storage device number of the storage device 2 as the copy source and the volume number of the operation volume VOL1 as the copy source. The user data as the copy target is data stored in the operation volume VOL1.

Meanwhile, for the copy destination, the secondary usage environment construction determination program 17 first acquires a server name of the secondary usage database server 4 and the region 6 where the secondary usage database server 4 is disposed from various types of information set by the user in the secondary usage environment information setting region 41 (FIG. 9) on the setting screen 40 (FIG. 9).

For example, in a case of an example in FIG. 9, the secondary usage environment construction determination program 17 acquires "Tokyo Region" as the region 6 in which the secondary usage database server 4 is disposed, and "Analytics-db" as the server name of the secondary usage database server 4.

Subsequently, the secondary usage environment construction determination program 17 calculates all secondary usage environment construction candidate plans based on the information on the copy source and the copy destination confirmed in step S20 (S21).

Specifically, the secondary usage environment construction determination program 17 inquires of the storage device 2 as the copy source about a capacity of the operation volume VOL1 as a copy target. The secondary usage environment construction determination program 17 refers to the region and zone management table 20, extracts all storage devices 2 disposed in the region 6 where the secondary usage database server 4 is disposed, and inquires of each of the extracted storage devices 2 whether a remaining capacity is equal to or larger than a capacity of the operation volume VOL1 as the copy target.

The secondary usage environment construction determination program 17 then creates the secondary usage data storage volume VOL3 in any of the storage devices 2 disposed in the region 6 where the secondary usage database server 4 is disposed, which has a remaining capacity equal to or larger than the capacity of the operation volume VOL1 as the copy target, and calculates, as the secondary usage environment construction candidate plan, all combinations of a location of the secondary usage data storage volume VOL3 and the copy method when copying data of the operation volume VOL1 to the secondary usage data storage volume VOL3 by any copy method.

At this time, the secondary usage e environment construction determination program 17 refers to the network management table 24 (FIG. 7) and also considers whether the zone 7 in which the operation volume VOL1 as the copy source is present and the zone 7 in which the storage device 2 in which a volume to be the secondary usage data storage volume VOL3 is created is present are connected by a network.

The secondary usage environment construction determination program 17 creates the construction plan list 60 (FIG. 13) in which secondary usage environment construction candidate plans calculated as described above are registered. At this stage, the construction plan list 60 is created in which the plan identifiers respectively assigned to the calculated secondary usage environment construction candidate plans are stored in the plan identifier column 60A (FIG. 13), the copy method used in the secondary usage environment construction candidate plan is stored in the copy method column 60B (FIG. 13), and other portions are blank. The secondary usage environment construction determination program 17 stores "0" in the priority column 60G (FIG. 13) of each record.

Subsequently, the secondary usage environment construction determination program 17 determines whether it is possible to construct the secondary usage environment based on a calculation result of step S21 (S22). This determination can be made by determining whether at least one record is present in the construction plan list 60.

When a negative result is obtained in the determination, the secondary usage environment construction determination program 17 determines that the secondary usage environment desired by the user cannot be constructed (S33), and then ends the secondary usage environment construction candidate plan calculation process and returns to the secondary usage environment construction support process.

In this case, a negative result is obtained in step S3 of the secondary usage environment construction support process. As a result, in step S11 of the secondary usage environment construction support process, a message indicating that the secondary usage environment desired by the user cannot be constructed is displayed on the display device 14.

In contrast, when a positive result is obtained in the determination of step S22, the secondary usage environment construction determination program 17 refers to the service and configuration information management table 22 (FIG. 5), confirms copy service that can be used by the storage devices 2 as the copy source and the copy destination, and confirms a content of a detailed request set by the user on the setting screen 40 (FIG. 9) (S23).

Subsequently, the secondary usage environment construction determination program 17 determines, based on the confirmation content of step S23, whether "performance priority" is selected as a detailed request on the setting screen 40 (S24). When the secondary usage environment construction determination program 17 obtains a negative result in the determination, the process proceeds to step S26.

In contrast, when a positive result is obtained in the determination of step S24, the secondary usage environment construction determination program 17 deletes the secondary usage environment construction candidate plan whose copy method is the virtual remote copy from the secondary usage environment construction candidate plans registered in the construction plan list 60 (S25).

The secondary usage environment construction determination program then determines, based on a content of the detailed request acquired in step S23, whether "daily operation" is selected as a schedule on the setting screen 40 (S26).

When a positive result is obtained in the determination, the secondary usage environment construction determination program 17 lowers a value of the priority stored in the priority column 60G (FIG. 13) of the record corresponding to the secondary usage environment construction candidate plan whose copy method is the virtual remote copy from the secondary usage environment construction candidate plans registered in the construction plan list 60 by "1" (S26).

In contrast, when a positive result is obtained in step S26, the secondary usage environment construction determination program 17 increases the value of the priority stored in the priority column 60G of the record corresponding to the secondary usage environment construction candidate plan whose copy method is the virtual remote copy from the secondary usage environment construction candidate plans registered in the construction plan list 60 by "1" (S27).

Next, the secondary usage environment construction determination program 17 determines whether a secondary usage environment construction candidate plan remains in the construction plan list 60 (S29).

When a negative result is obtained in the determination, the secondary usage environment construction determination program 17 determines that the secondary usage environment desired by the user cannot be constructed (S33), and then ends the secondary usage environment construction candidate plan calculation process and returns to the secondary usage environment construction support process.

In this case as well, a negative result is obtained in step S3 of the secondary usage environment construction support process (FIG. 12). As a result, in step S11 of the secondary usage environment construction support process, a message indicating that the secondary usage environment desired by the user cannot be constructed is displayed on the display device 14.

In contrast, when a positive result is obtained in the determination of step S29, the secondary usage environment construction determination program 17 calculates, for each secondary usage environment construction candidate plan registered in the construction plan list 60 at that time, a time and cost required for copying the user data when the secondary usage environment construction candidate plan is adopted, and a subsequent operation cost (S30).

As a method for calculating the time and cost required for copying and the operation cost in step S30, a present calculation method can be widely applied. For example, the time required for copying can be calculated by acquiring a bandwidth of a network connecting the storage devices 2 as the copy source and copy destination from the network management table 24 (FIG. 7) and dividing a capacity of the operation volume VOL1 as the copy target by the bandwidth.

The cost required for copying can be calculated by dividing the capacity of the operation volume VOL1 as the copy target by a communication fee per unit data amount, which is separately managed by the secondary usage environment construction support device 5.

The cost required for operation can be calculated by multiplying all usage fees of the volume per unit data amount in the storage device 2 as the copy destination separately managed by the secondary usage environment construction support device 5, a usage fee of the volume per unit period, a capacity of the operation volume VOL1 as the copy target, and an operation period, for example, in the case of daily operation with a defined operation period.

Thereafter, the secondary usage environment construction determination program 17 refers to a content of the detailed request confirmed in step S23, and ranks the secondary usage environment construction candidate plans (S31).

For example, the secondary usage environment construction determination program 17 adds, for each of the secondary usage environment construction candidate plans remaining in the construction plan list 60 at that time, a current time to the construction time calculated in step S30 to calculate a time at which a construction of the secondary usage environment based on the secondary usage environment construction candidate plan is completed when the construction is immediately performed, and adds "1" to the priority of the secondary usage environment construction candidate plan if the time is before the construction completion time in the detailed request.

When "cost priority" is selected in the detailed request, the secondary usage environment construction determination program 17 adds "1" to the priority of the secondary usage environment construction candidate plan with the lowest sum of the construction cost and the operation cost calculated in step S30 among the secondary usage environment construction candidate plans registered in the construction plan list 60.

The secondary usage environment construction determination program 17 sorts the secondary usage environment construction candidate plans registered in the construction plan list 60 in descending order of priority. At this time, regarding the secondary usage environment construction candidate plan having the same priority, ranking may be performed based on the time and cost required for copying the user data when the secondary usage environment construction candidate plan is adopted, as calculated in step S30, the subsequent operation cost, and the content of the detailed request set by the user. For example, when the cost priority is set in the detailed request, the ranking of the secondary usage environment construction candidate plan having a lower sum of the construction cost and the operation cost may be set to be high.

In step S4 of the secondary usage environment construction support process described above with reference to FIG. 12, the secondary usage environment construction determination program 17 generates the construction candidate plan list screen 50 in which secondary usage environment construction candidate plans are listed in the sorted order registered in the construction plan list 60, and displays the construction candidate plan list screen 50 on the display device 14.

Subsequently, the secondary usage environment construction determination program 17 determines that the secondary usage environment desired by the user can be constructed (S32), and then ends the secondary usage environment construction candidate plan calculation process and returns to the secondary usage environment construction support process.

5. Effects of Present Embodiment

As described above, the secondary usage environment construction support device 5 in the present embodiment calculates all the secondary usage environment construction candidate plans including the copy method when copying data between a designated copy source and copy destination of the data, calculates the time and cost required for copying the data to the copy destination and the operation cost of the secondary usage environment constructed for each of the calculated secondary usage environment construction candidate plans, ranks the secondary usage environment construction candidate plans based on the calculation result, and presents the ranked secondary usage environment construction candidate plans in a ranking format.

Therefore, according to the secondary usage environment construction support device 5, the user can construct an optimal secondary usage environment by simply selecting a secondary usage environment construction candidate plan matching a request (detailed request) from the presented secondary usage environment construction candidate plans without requiring special knowledge, and can support the construction of the optimum secondary usage environment for data.

6. Other Embodiments

In the above-described embodiment, a case is described in which the secondary usage environment construction support device 5 performs construction by one computer device, but the invention is not limited thereto, and the secondary usage environment construction support device 5 may be implemented by a plurality of computer devices implementing a distributed computing system.

In the above-described embodiment, a case is described in which a function as a construction candidate plan calculation unit configured to calculate all construction plans for the secondary usage environment including the copy method when copying the data between the designated copy source and copy destination of the data, and a function as a construction candidate plan presentation unit configured to calculate, for each of the construction candidate plans calculated by the construction candidate plan calculation unit, the time and the cost required for copying the data to the copy destination and the operation cost of the secondary usage environment to be constructed, ranks the construction candidate plans based on the calculation result, and presents the ranked construction candidate plans in a ranking format are implemented in one secondary usage environment construction determination program 17. However, the invention is not limited thereto, and the secondary usage environment construction determination program 17 may be implemented by being divided into a first program having a function of the construction candidate plan calculation unit and a second program having a function of the construction candidate plan presentation unit.

Further, in the above-described embodiment, a case is described in which the detailed request includes a request indicating which of the performance and the cost is prioritized to construct the secondary usage environment, a request indicating the construction completion time of the secondary usage environment, a request indicating the operation period of the secondary usage environment, and a request indicating whether the secondary usage environment is operated daily or monthly. However, the invention is not limited thereto, and the detailed request may include only a part of the requests, or may further include other requests.

Further, in the above-described embodiment, a case is described in which the secondary usage environment construction support device 5 presents the calculated secondary usage environment construction candidate plan to the user in a ranking format. However, the invention is not limited thereto, and the calculated secondary usage environment construction candidate plan may be simply presented to the user together with absolute evaluations of a construction cost, an operation cost, a construction time, and the like without a comparison with other secondary usage environment construction candidate plans such as ranking.

Further, in the above-described embodiment, a case is described in which the "schedule" can be selected from the two patterns of options, the "daily operation" or the "monthly operation" on the setting screen 40 described above with reference to FIG. 9. However, the invention is not limited thereto, and various usage frequencies may be selected such as annual, semi-annual, and temporary.

Further, in the above-described embodiment, a case is described in which the service and configuration information management table 22 is used to manage what service (backup service) each volume in the system is used for and in what configuration. However, the invention is not limited thereto, and the service and configuration information management table 22 may be used to manage which copy service among various types of backup service (copy service) each storage device 2 present in the system can provide such as remote copy, virtual remote copy, snapshot, migration, and a backup to object cloud storage. When the secondary usage environment construction candidate plan is calculated in step S21 of the secondary usage environment candidate plan calculation process described above with reference to FIG. 14, the information may be used.

INDUSTRIAL APPLICABILITY

The invention can be widely applied to a support device having various configurations for supporting the construction of the secondary usage environment for data.

What is claimed is:

1. A support device connected to a plurality of sites each having a server and a storage device, and for supporting construction of a secondary usage environment in which the server uses data stored in the storage device, the support device comprising:
   a construction candidate plan calculation unit configured to calculate a plurality of construction candidate plans for the secondary usage environment including a copy method for copying the data between a designated copy source site and a designated copy destination site of the data, wherein each construction candidate plan specifies a different copy method selected from a plurality of available copy methods based on database administrator requirements; and
   a construction candidate plan presentation unit configured to calculate, for each of the construction candidate plans calculated by the construction candidate plan calculation unit, a time and a cost required for copying the data and an operation cost of the secondary usage environment to be constructed, and to present the plurality of construction candidate plans based on a calculation result together with evaluations thereof.

2. The support device according to claim 1, wherein the evaluation is a priority, and
   the plurality of construction candidate plans are presented in a ranking format based on the priority.

3. The support device according to claim 1, further comprising:
   database information on each site and network information between the sites, wherein
   the construction candidate plan presentation unit calculates, based on a request related to the database information, the network information, and an operation form of the secondary usage environment, a plurality of construction candidate plans including a time and a cost required for copying the data and an operation cost.

4. The support device according to claim 3, wherein the request includes at least one content of which of a performance and a cost is prioritized to construct the secondary usage environment, and whether to operate the secondary usage environment in any of a construction completion time of the secondary usage environment, an operation period of the secondary usage environment, and a usage frequency, and
   the copy method includes a method for moving data between sites at the time of copying and a method for setting an access path to data at the time of copying and moving data between sites at the time of an access request.

5. The support device according to claim 4, wherein the copy method includes a method that synchronizes with data as the copy source and a method that does not synchronize with the data as the copy source.

6. The support device according to claim 1, further comprising:
   a replication execution unit configured to replicate, when one construction candidate plan is selected from the plurality of construction candidate plans, the data from the copy source site to the copy destination site in a copy method corresponding to the construction candidate plan.

7. The support device according to claim 6, wherein the replication execution unit outputs information related to a volume for the constructed secondary usage environment.

8. A support method executed by a support device configured to be connected to a plurality of sites each having a server and a storage device, and to support construction of a secondary usage environment in which the server uses data stored in the storage device, the support method comprising:
   a first step of calculating a plurality of construction candidate plans for the secondary usage environment including a copy method for copying the data between a designated copy source site and a designated copy destination site of the data, wherein each construction candidate plan specifies a different copy method selected from a plurality of available copy methods based on database administrator requirements; and
   a second step of calculating, for each of the calculated construction candidate plans, a time and a cost required for copying the data and an operation cost of the secondary usage environment to be constructed, and to present the plurality of construction candidate plans based on a calculation result together with evaluations thereof.

9. The support method according to claim 8, wherein the evaluation is a priority, and
   the plurality of construction candidate plans are presented in a ranking format based on the priority.

10. The support method according to claim 8, wherein the support device holds database information on each site and network information between the sites, and
    in the second step, the support device calculates, based on a request related to the database information, the network information, and an operation form of the secondary usage environment, a plurality of construction candidate plans including a time and a cost required for copying the data and an operation cost.

11. The support method according to claim 10, wherein the request includes at least one content of which of a performance and a cost is prioritized to construct the secondary usage environment, and whether to operate the secondary usage environment in any of a construction completion time of the secondary usage environment, an operation period of the secondary usage environment, and a usage frequency, and
    the copy method includes a method for moving data between sites at the time of copying and a method for setting an access path to data at the time of copying and moving data between sites at the time of an access request.

12. The support method according to claim 11, wherein the copy method includes a method that synchronizes with data as the copy source and a method that does not synchronize with the data as the copy source.

13. The support method according to claim 8, further comprising:
a third step of replicating, when one construction candidate plan is selected from the plurality of construction candidate plans, the data from the copy source site to the copy destination site in a copy method corresponding to the construction candidate plan.

14. The support method according to claim 13, wherein in the third step, the support device outputs information related to a volume for the constructed secondary usage environment.

* * * * *